(12) United States Patent
Pichardo et al.

(10) Patent No.: US 7,740,404 B2
(45) Date of Patent: Jun. 22, 2010

(54) X-RAY FILM HOLDER FOR USE WITH DENTAL SIMULATION MODELS

(75) Inventors: Penelope Pichardo, Bayside, NY (US); Phillip Librach, Syosset, NY (US); Fikret Ljujkovic, Flushing, NY (US)

(73) Assignee: Columbia Dentoform Corporation, Long Island City, NY (US)

( * ) Notice: Subject to any disclaimer, the term of this patent is extended or adjusted under 35 U.S.C. 154(b) by 0 days.

(21) Appl. No.: 12/413,936

(22) Filed: Mar. 30, 2009

(65) Prior Publication Data

US 2009/0245472 A1    Oct. 1, 2009

Related U.S. Application Data

(60) Provisional application No. 61/040,446, filed on Mar. 28, 2008.

(51) Int. Cl.
    *A61B 6/14* (2006.01)
    *G03B 42/04* (2006.01)
(52) U.S. Cl. .................. 378/168; 378/180; 378/187
(58) Field of Classification Search .......... 378/38–40, 378/167–171, 177, 180, 182, 187; 433/215, 433/229; D24/107, 158, 161
    See application file for complete search history.

(56) References Cited

U.S. PATENT DOCUMENTS

| | | | | | |
|---|---|---|---|---|---|
| 2,522,201 A | * | 9/1950 | Stern | ........................... | 378/170 |
| 2,733,354 A | * | 1/1956 | Vloch | ........................... | 378/162 |
| 2,753,461 A | * | 7/1956 | Goldberg | ........................... | 378/170 |
| 2,786,947 A | * | 3/1957 | Lieberman | ........................... | 378/168 |
| 3,356,845 A | * | 12/1967 | Bergendal | ........................... | 378/168 |
| 3,444,371 A | * | 5/1969 | Via, Jr. | ........................... | 378/168 |
| 3,454,763 A | * | 7/1969 | Goldenthal | ........................... | 378/41 |
| 3,473,026 A | * | 10/1969 | Updegrave | ........................... | 378/170 |
| 4,048,506 A | * | 9/1977 | Updegrave | ........................... | 378/170 |
| 4,075,494 A | * | 2/1978 | Jermyn | ........................... | 378/170 |
| 4,592,084 A | * | 5/1986 | McAuslan | ........................... | 378/170 |
| 4,731,808 A | * | 3/1988 | Ogunsunlade | ........................... | 378/170 |
| 4,945,553 A | * | 7/1990 | Willis | ........................... | 378/168 |
| 4,965,885 A | * | 10/1990 | Fuhrmann | ........................... | 378/168 |
| 5,256,982 A | * | 10/1993 | Willis | ........................... | 378/168 |
| 5,625,666 A | * | 4/1997 | Willis | ........................... | 378/167 |
| 6,382,831 B1 | * | 5/2002 | Bacchetta et al. | ........................... | 378/170 |
| 2009/0232280 A1 | * | 9/2009 | Tresso et al. | ........................... | 378/169 |

\* cited by examiner

*Primary Examiner*—Edward J Glick
*Assistant Examiner*—Anastasia Midkiff
(74) *Attorney, Agent, or Firm*—Panitch Schwarze Belisario & Nadel LLP (57) ABSTRACT

An x-ray film holder is provided to attach to a dental simulation model and to support an x-ray film. The x-ray film holder includes a base with a releasable contact fastener for attaching the dental simulation model thereto. The x-ray film holder also includes a support member to releasably hold an x-ray film. The support member can be configured as an adjustable support member for accommodating x-ray films of various film thicknesses.

24 Claims, 6 Drawing Sheets

X-RAY FILM HOLDER FOR USE WITH DENTAL SIMULATION MODELS

CROSS-REFERENCE TO RELATED APPLICATIONS

This application is entitled to and claims the benefit of the priority pursuant to 35 U.S.C. §119(e) of U.S. Provisional Patent Application No. 61/040,446, filed Mar. 28, 2008, the disclosure of which is hereby incorporated herein by reference.

BACKGROUND OF THE INVENTION

The present invention relates to an x-ray film holder for use with dental simulation models. In particular, the x-ray film holder includes a base for holding a portion of the dental simulation model anterior to an x-ray film also held by the x-ray holder for taking x-rays of the dental simulation model.

Figure 1:
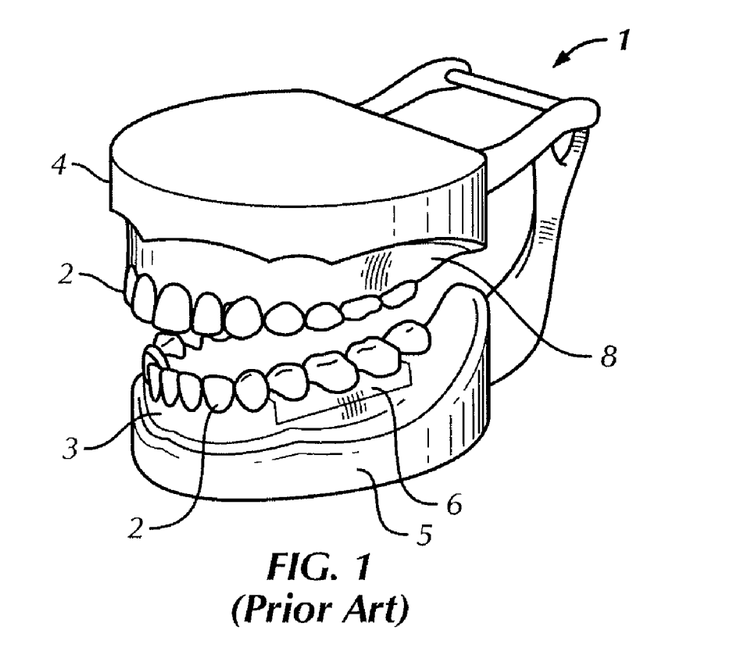
FIG. 1 is a perspective view of a conventional dental simulation model.
Figure 2:
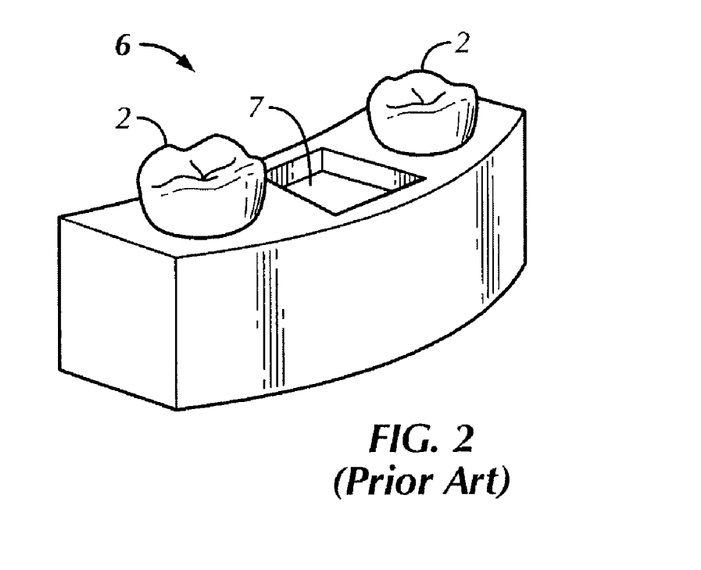
FIG. 2 is a top perspective view of a sextant of the conventional dental simulation model of FIG. 1.

Dental simulation models are well known for teaching the art of dentistry. Typically, dental simulation models are used in dental schools, and particularly in the dental licensure examination, to simulate teeth 2 and gums 3 of a human mouth. Referring to FIGS. 1 and 2, there is shown a conventional dental simulation model 1 that includes an upper or lower arch 4, 5 or both, as shown in FIG. 1, or only one of the upper or lower arches 4, 5 or a section or sextant 6 of one of the upper or lower arches 4, 5, as shown in FIG. 2. The sextant 6 (FIG. 2) is selectively removable from the dental simulation model 1 so it can be examined by an aspiring dentist, an instructor or an examiner. The sextant 6, for example, may include an indent 7, between two teeth 2 that is filled with resin that replicates a decayed tooth (not shown) for simulating an endodontic procedure.

After a procedure is performed on the dental simulation model 1 or an x-ray is otherwise required, the sextant 6 is removed from the dental simulation model 1 and taken to an x-ray machine for x-raying. The x-ray machine is too expensive and large to be provided for individual dental chairs, so moving the sextant 6 to the x-ray machine allows for multiple students to share one or more x-ray machines.

The sextant 6 is then placed within an open-topped box that is slightly larger than the sextant 6 along with a digital or traditional electromagnetic radiation x-ray film which is positioned along one side of the box. However, the sextant 6 may move unintentionally with respect to the film as the box is being positioned for x-raying or a student may attempt to cheat by altering the angle of the sextant 6 with respect to the x-ray film from the standard angle for the taking of x-rays to achieve a desired appearance of the drilling and or filling performed on the sextant 6.

What is therefore needed, but not provided in the prior art, is an x-ray film holder that releasably holds the sextant 6 in place at a fixed location and/or orientation relative to the x-ray film, a means to indicate on the resulting x-ray film the orientation of the sextant 6 with respect to the x-ray film, and a means to hold x-ray films of various film thicknesses.

BRIEF SUMMARY OF THE INVENTION

Briefly stated, the present invention comprises a radiolucent x-ray film holder having a base member that includes a substantially planar surface to receive a dental simulation model. A releasable contact fastener is positioned proximate the planar surface to releasably fasten the dental simulation model to the base member. A support member is connected to the base member and includes a support fastener to releasably support an x-ray film.

In another aspect, the present invention comprises a dental x-ray training system having a dental simulation model that includes at least one sextant having a first fastener and an x-ray film holder. The x-ray film holder includes a first member having a second fastener. The second fastener operatively engages the first fastener to releasably and adjustably fasten the sextant to the first member. A second member is connected to the first member and is configured to receive and releasably support an x-ray film. The second member includes a radiopaque marker.

In another aspect, the present invention comprises a holder for supporting a dental simulation model and a film. The holder includes a base having a substantially planar surface to receive the dental simulation model. A releasable contact fastener is positioned proximate the planar surface to releasably fasten the base to the dental simulation model. A first support member is connected to the planar surface. An extension is slidably connectable with the base and includes a second support member that operatively engages with the first support member to releasably support the film.

In yet another aspect, the present invention comprises a dental x-ray training system including a dental simulation model that includes at least one sextant having a first fastener and a holder. The holder includes a first member having a second fastener that operatively engages the first fastener to releasably and adjustably fasten the sextant to the holder. A first support extends from the first member. A second member is slidably connectable with the first member and includes a second support that operatively engages with the first support to releasably support a film.

In another aspect, the present invention comprises a radiolucent device having a base configured to releasably receive and fasten to a dental simulation model. An adjustable clamp is connected to the base to secure the base to an x-ray film. The adjustable clamp includes a radiopaque marker configured between the dental simulation model and the x-ray film.

BRIEF DESCRIPTION OF THE SEVERAL VIEWS OF THE DRAWINGS

The following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the x-ray film holder and designated parts thereof. Unless specifically set forth herein, the terms "a", "an" and "the" are not limited to one element but instead should be read as meaning "at least one". The terminology includes the words noted above, derivatives thereof and words of similar import.

Figure 3:
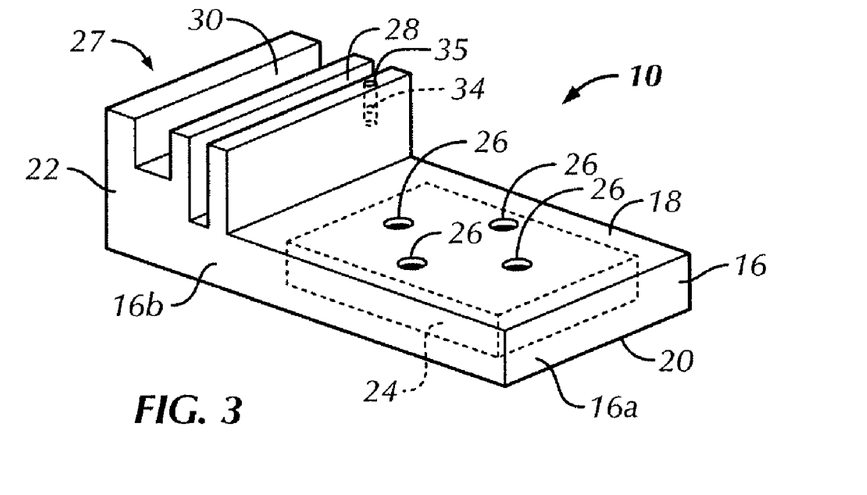
FIG. 3 is a perspective view of an x-ray film holder in accordance with a preferred embodiment of the present invention.
Figure 4:
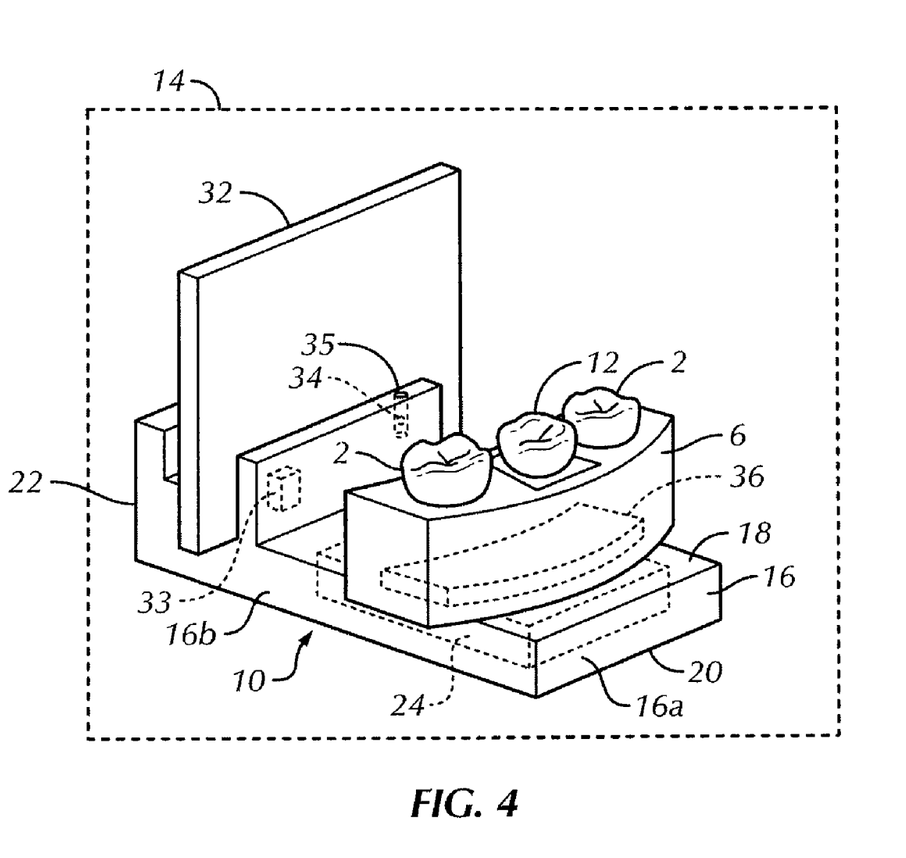
FIG. 4 is a perspective view of the x-ray film holder of FIG. 1 shown holding an x-ray film and a dental simulation model and schematically illustrated in an x-ray machine.

Referring to the drawings in detail, wherein like reference numerals indicate like elements throughout, there is shown in FIGS. 3 and 4 a preferred embodiment of an x-ray film holder, generally designated 10, in accordance with the present invention. The x-ray film holder 10 can be used with a dental simulation model, such as a section or sextant 6 of the dental simulation model 1 (see also FIGS. 1 and 2). However, it is within the intent and scope of the present invention that the x-ray film holder 10 can be used with any other dental simulation model known in the art that can or needs to be x-rayed. The x-ray film holder 10 is made from a radiolucent material to form a radiolucent device. Such radiolucent materials are known in the art and a detailed description of them is not necessary for a complete understanding of the present invention.

The sextant 6 (FIG. 4) of the dental simulation model 1 is preferably a third of one of the upper or lower arches 4, 5, and preferably includes at least a pair of teeth 2 and a working tooth 12 positioned between the teeth 2. The working tooth 12 is typically formed from a resin material that replicates a tooth and its pulp for simulating a natural tooth during endodontic procedures used for training and/or testing aspiring dentists. The sextant 6 can also be substituted with any area of the dental simulation model 1 that is desired to be viewed through an x-ray machine 14 (shown schematically in FIG. 4). Additionally, the sextant 6 is not limited to a sextant 6 having two teeth 2 and a working tooth 12 and can be any portion of the dental simulation model 1, such as an individual tooth 2, an entire arch 4, 5 or the entire dental simulation model 1 that is desired to be x-rayed.

Referring to FIG. 3, the x-ray film holder 10 includes a base 16, such as a base member or a first member, having a planar upper surface 18 and a planar lower surface 20 that is spaced from and generally parallel to the upper surface 18. However, the base 16 can have any suitable shape, such as an oval, circle, rectangle, or trapezoidal shape. The base 16 includes a fastener 24 positioned proximate the planar upper surface 18 for fastening the sextant 6 to the base 16. Preferably, the fastener 24 is a releasable contact fastener. A releasable contact fastener is generally a fastener that fastens upon contact, such as a ferromagnetic member and a magnet, hook and loop fasteners, a detent or a releasable adhesive. More preferably, the fastener 24 is a magnet 24 that is disposed or substantially housed within the base 16.

The magnet 24 operatively associates with a corresponding ferromagnetic member housed within, e.g., the sextant 6, as further discussed below. The magnet 24 is positioned on the base 16 a predetermined distance from a support member 22. Details regarding the support member 22 are discussed below. Positioning the magnet 24 a predetermined distance, such as several millimeters to several inches, apart from the support member 22 advantageously allows for the dental simulation model 1 or a sextant 6, to be positioned in a spaced apart relation to an x-ray film 32 supported by the support member 22. This predetermined positioning of the sextant 6 and the x-ray film 32 therefore provides for optimum spacing of the two for the taking of radiographs.

The base 16 can optionally be partially exposed with, for example, a plurality of openings 26 for exposing the magnet 24 to the upper surface 18 of the base 16. The openings 26 are preferably four spaced apart circular openings in the upper surface 18, but the openings 26 can be a single opening and can be configured to have any shape, such as rectangular or oval opening. The openings 26 serve as channels such that the magnet 24 is partially exposed through the upper surface 18 to increase the strength of the magnet 24 with respect to a ferromagnetic object (i.e., a corresponding fastener) placed on the upper surface 18.

The magnet 24 is preferably molded within the x-ray film holder 10, but can alternatively be inserted and/or affixed to the x-ray film holder 10 after the x-ray film holder 10 is formed. The magnet 24 can also be completely covered or completely exposed through the upper surface 18.

A corresponding fastener 36, e.g., a ferromagnetic member 36, is configured within the sextant 6 to correspondingly fasten to the base 16. The ferromagnetic member 36 can be any member that is attracted by a magnetic force. Such materials for the ferromagnetic member 36 includes, but are not limited to, ferrous metals such as iron, steel, cobalt and nickel. The ferromagnetic member 36 can be positioned about any location within the sextant 6 such that the ferromagnetic member 36 is sufficiently attracted to the base 16 by the magnet 24.

Figure 5:
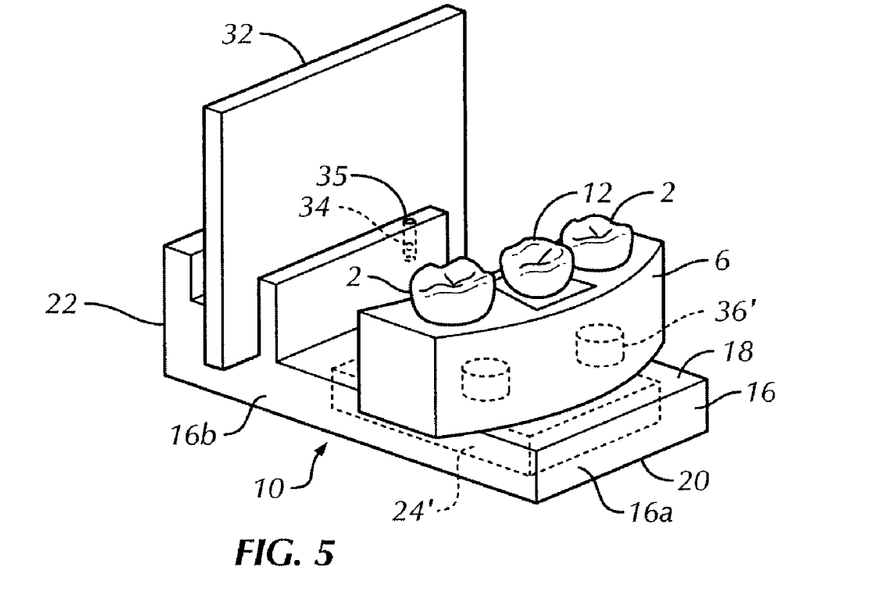
FIG. 5 is a perspective view of an x-ray film holder shown holding an x-ray film and a sextant of a dental simulation model in accordance with another preferred embodiment of the present invention.

Alternatively, instead of the magnet 24 being disposed within the base 16, the base 16 can be configured with a ferromagnetic member 24' (FIG. 5). The ferromagnetic member 24' can be configured within the base 16 similarly to that of the magnet 24 as described above. When configured with a ferromagnetic member 24', the x-ray film holder 10 can be used in conjunction with a sextant 6 that includes a magnetized member 36' for magnetically attaching the x-ray film holder 10 to the sextant 6.

Referring now to FIGS. 3 and 4, the base 16 has a first end 16a and a second end 16b. A support member 22 extends outwardly and upwardly from the second end 16b. The support member 22 preferably has a width generally equal to the base 16 and a height that is greater than the base 16. However, the support member 22 can be configured to have any size relative to the base 16. The support member 22 includes a support fastener 27 that releasably supports an x-ray film 32. Preferably, the support fastener 27 is configured as a slot 28 that extends into the support member 22 to secure the x-ray film 32 by an interference or press-fit.

The support fastener 27 can be configured to include a plurality of slots, such as first and second slots 28, 30 extending into the support member 22 for releasably holding an x-ray film 32. The first and second slots 28, 30 are each configured to releasably receive an x-ray film 32 having different film thicknesses. That is, each slot is configured with a different slot width to accommodate x-ray films having different film thicknesses, as conventional x-ray films 32 are typically manufactured with various thicknesses, depending on the type of film used. The x-ray film 32 can be any type of film known in the art for use with x-ray machines, such as a digital or a traditional electromagnetic radiation x-ray film.

Referring to FIG. 4, the x-ray film 32 preferably extends further upwardly than the support member 22. The film 32 can extend further laterally than the x-ray film holder 10, but the x-ray film holder 10 can alternatively be sized to extend further laterally than the film 32. The slot width of the first and second slots 28, 30 are configured to be slightly smaller than the width of the x-ray film 32 to releasably, selectively and firmly hold the x-ray film to the x-ray film holder 10 through a slight compression or press-fit. The support member 22 can alternatively be configured to include a spring biasing member 33 to fasten the x-ray film 32 to the x-ray film holder 10, in addition to or in place of the first and second slots 28, 30. The support member 22 preferably positions the x-ray film 32 generally perpendicular to the upper surface 18, but the x-ray film 32 can alternatively be positioned at any angle with respect to the upper surface 18.

The x-ray film holder 10 also preferably includes a position marker 34. The position marker 34 is disposed within the support member 22 such that it is between the x-ray film 32 supported by the support member 22 and the sextant 6 fastened to the base 16. The position marker 34 can be a spherical ball bearing made of metal or any other object formed of a generally radiopaque material. Preferably, the position marker 34 is positioned such that an image of the position marker 34 is left on the x-ray film 32 following an x-ray. The position marker 34 is preferably inserted into the support member 22 through an open channel 35, but can be embedded during the fabrication process of the x-ray film holder 10 or otherwise attached to the support member 22.

The sextant 6 preferably includes a ferromagnetic member 36, as the releasable contact fastener, embedded within or otherwise a part of the sextant 6 for connecting the sextant 6 to the x-ray film holder 10. Alternatively, the sextant 6 can be configured with a magnet 36' (or a plurality of magnets) for magnetically attaching to the x-ray film holder 10 configured with a ferromagnetic member 24', as shown in FIG. 5.

In use, a user removes the sextant 6, or any other desired portion of the dental simulation model 1, from the dental simulation model 1 and places the sextant 6 on the upper surface 18 of the x-ray film holder 10. A magnetic force between the magnet 24 within the x-ray film holder 10 and the ferromagnetic member 36 within the sextant 6 releasably holds the sextant 6 to the upper surface 18 of the x-ray film holder 10. The user then places an x-ray film 32 within the support member 22. The user can then pivot or rotate the sextant 6 with respect to the x-ray film 32 until the sextant 6 is properly positioned on the upper surface 18. The sextant 6 remains in the position set by the user until a sufficient force is exerted on the sextant 6 to overcome the magnetic attraction force between the sextant 6 and the x-ray film holder 10 to adjust the sextant 6 on the surface 18 or to otherwise remove the sextant 6 from the x-ray film holder 10.

The user than places the x-ray film holder 10, x-ray film 32 and sextant 6 into position for x-raying by the x-ray machine 14. An x-ray is then taken of the sextant 6, creating an x-ray image of the sextant 6 on the x-ray film 32 along with the location of the position marker 34. The position marker 34 will appear on the x-ray film 32 in relation to the ferromagnetic member 36 in the sextant 6 to indicate the position that the sextant 6 was placed on the x-ray film holder 10 during the x-raying procedure. The user then removes the x-ray film holder 10 and sextant 6 from the x-ray machine 14 and detaches the sextant 6 and the x-ray film 32 from the x-ray film holder 10. The sextant 6 may then be placed back in the dental simulation model 1.

Referring now to FIGS. 6-12, there is shown a holder 110 for supporting a dental simulation model such as a sextant 106 and a film 132, such as an x-ray film 132 in accordance with another embodiment of the present invention. The holder 110 includes a base 112 and an extension 122. The base and extension 112, 122 are configured to slidingly engage each other so as to be slidingly connectable. For the sake of brevity, like element numbers have been used between the embodiments of FIGS. 3-4 and FIGS. 6-12. Therefore, a complete description of similar elements has been omitted for purposes of convenience and brevity only, and is not limiting.

Referring now to FIG. 6-8 and 12, the base 112 includes a base portion 116, a slotted portion 114 and a first support member 118. The base portion 116 includes an upper surface 18', a lower surface 20', and openings 26' similarly constructed as described above for base 16. For example, the base 112 includes a releasable contact fastener 24' positioned proximate the upper surface 18' of the base portion 116 to releasably fasten a sextant 106 to the base 112. The slotted portion 114 is connected to the underside of the base portion 116. The slotted portion 114 is generally configured as a female slot. The slotted portion 114 includes left and right generally L-shaped in cross section channels 114a, 114b that extend along the lateral edges of the base portion 116. The channels 114a, 114b are of the L-shaped configuration that are each directed inwardly to form a slot for receiving a corresponding male portion. While the present embodiment is preferably configured with the base 112 having a female slot and the extension 122 configured as the male counterpart, the base 112 can alternatively be configured as the male counterpart while the extension 122 configured with the female slot.

The base portion 116 also includes a fastener 120 (FIG. 11) for fastening together the base 112 and the extension 122. The fastener 120 can be any fastener capable of fastening the base and extension 112, 122 together to prevent sliding engagement. Preferably, the fastener 120 is a set thumb screw 120, but can alternatively be a clamp, a locking pin, or the like. The base portion 116 is configured with a threaded thru-hole 128 extending laterally through one of the channels 114a, 114b for receiving the set screw 120, which is generally configured as any conventional set screw.

Figure 6:
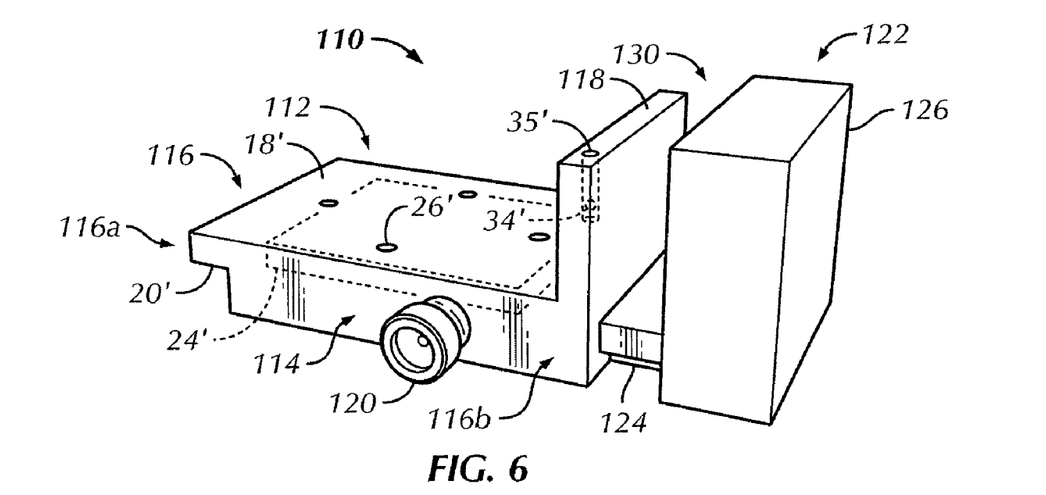
FIG. 6 is a perspective view of a holder for supporting a dental simulation model and a film in accordance with a further preferred embodiment of the present invention.
Figure 7:
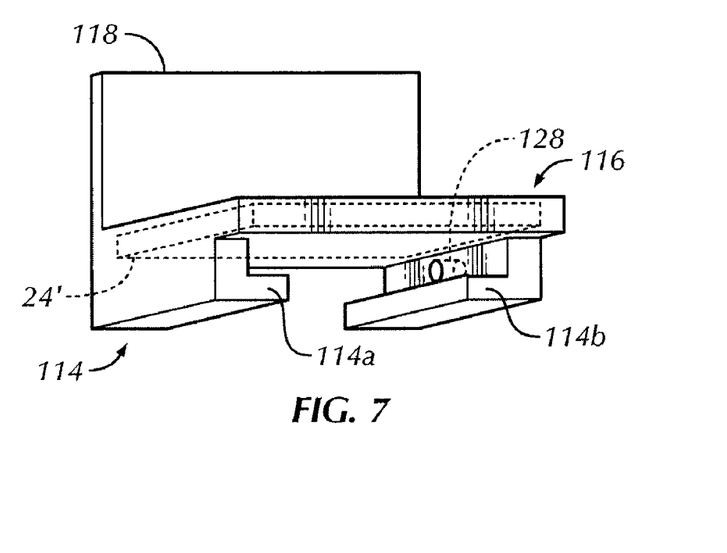
FIG. 7 is a side perspective view of a base of the holder of FIG. 6.
Figure 8:
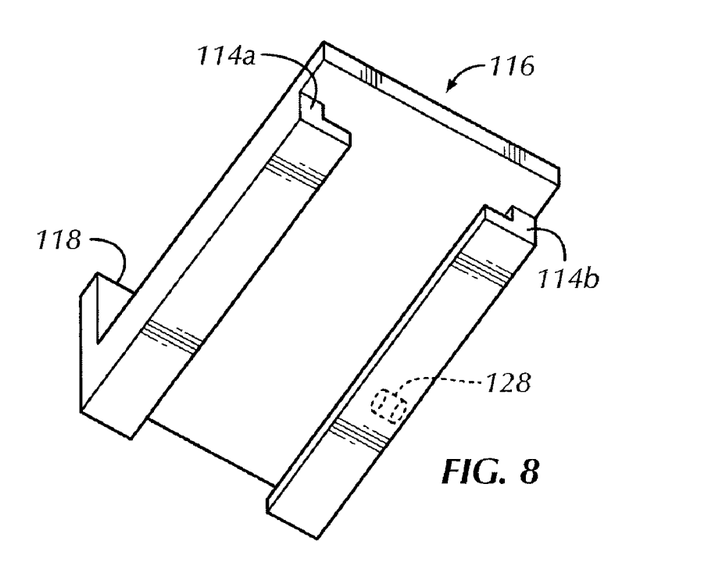
FIG. 8 is a bottom perspective view of the base of FIG. 7.
Figures 9, 10:
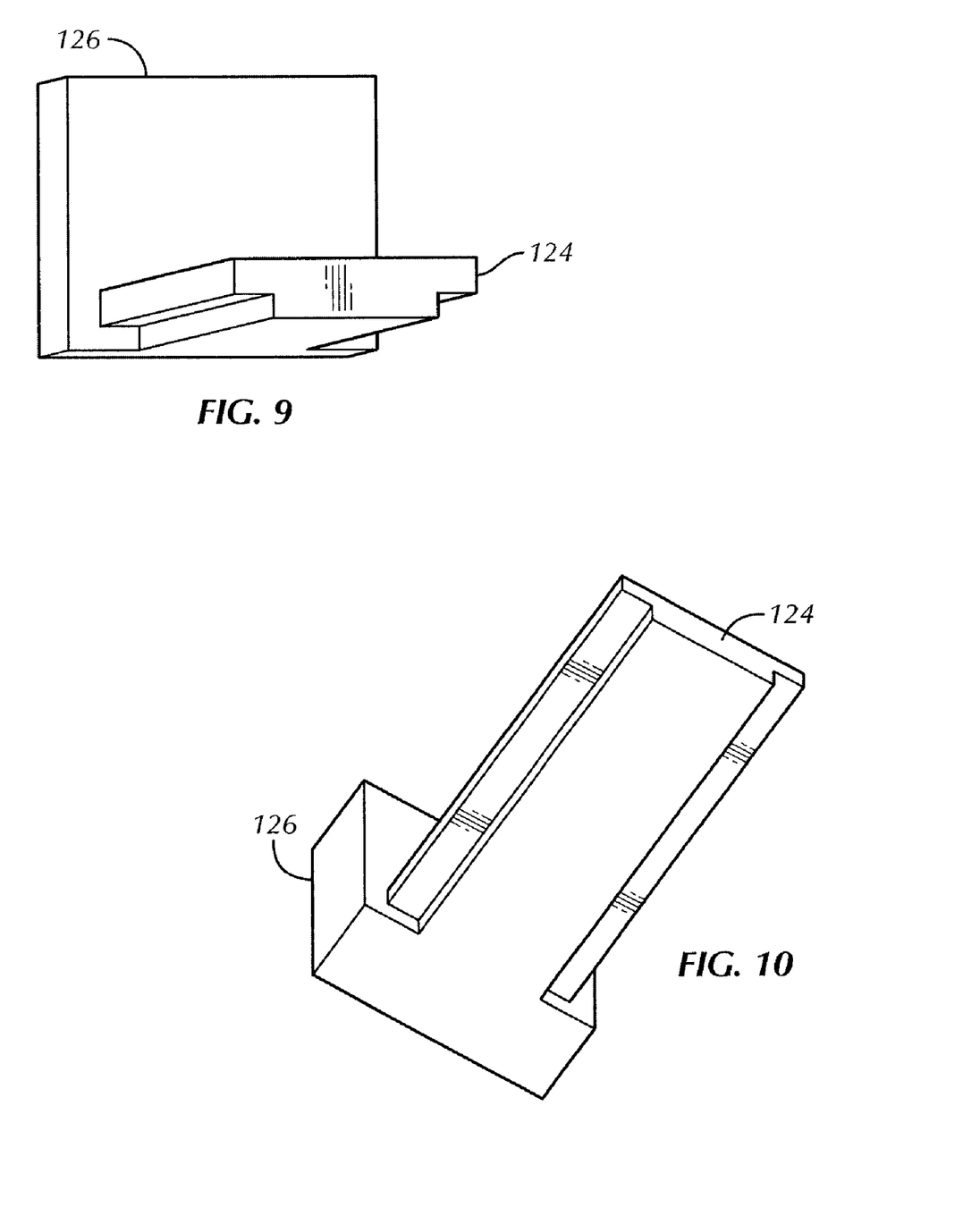
FIG. 9 is a side perspective view of an extension of the holder of FIG. 6.
FIG. 10 is a bottom perspective view of the extension of FIG. 9.
Figure 11:
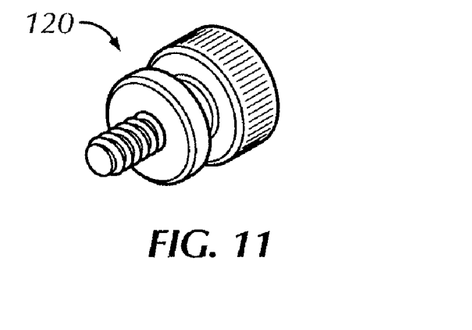
FIG. 11 is a perspective view of a set screw fastener of the holder of FIG. 6.

Referring now to FIGS. 6 and 9-10, the first support member 118 is configured as a substantially vertical member that extends generally perpendicular to and is connected to the base portion 116. The first support member 118 is connected to the base portion 116 about its second end 116b so as to be flush with the ends of the slotted portion 114 about the second end 116b. The first support member 118 can optionally include a channel 35' and a position marker 34'.

The extension 122 is generally configured as shown in FIGS. 6, 9 and 10. The extension 122 includes a generally planar male member 124, generally T-shaped in cross section, keyed to slidingly engage within the slotted portion 114 of the base 112, and a second support member 126. The second support member 126 is configured as a substantially vertical member that is generally perpendicular to the male member 124. In operation, the first support member 118 and the second support member 126 are configured to releasably support an x-ray film 132.

The base and extension 112, 122 are assembled by sliding the male member 124 of the extension 122 into the second end 116b of the slotted portion 114, as shown in FIG. 6. The first and second support members 118, 126 cooperatively form a support to releasably engage and support an x-ray film 132. The width of the gap 128 formed by the first and second support members 118, 126 is adjustable and can be varied by sliding the extension 122 further into or out of the base's slotted portion 114. Once the desired gap width 130 is determined, the set screw 120 is secured to firmly hold the base and extension 112, 122 in a fixed position. The construct and operation of the base and extension 112, 122 essentially forms an adjustable clamp capable of clamping an x-ray film of any thickness to the x-ray holder 110.

Figure 12:
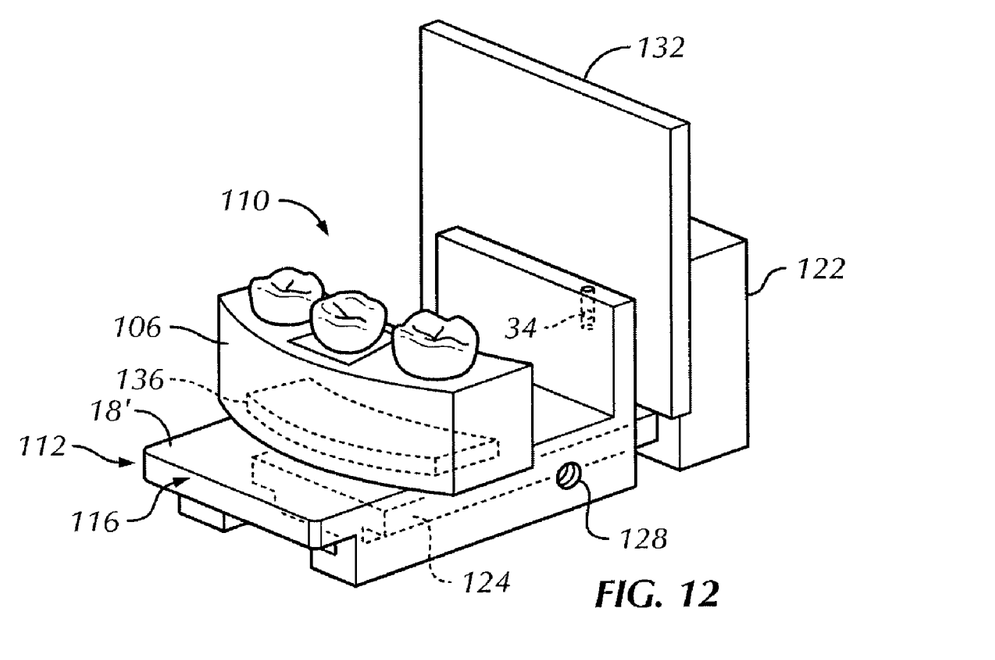
FIG. 12 is a perspective view of a dental x-ray training system in accordance with yet another preferred embodiment of the present invention.

Referring now to FIG. 12, when the holder 110 includes a sextant 106 it forms a dental x-ray training system that includes a dental simulation model having at least one sextant 106 with a first fastener 136, and an x-ray film holder 10, 110 in accordance with any of the above embodiments (only holder 110 shown for convenience). The first fastener 136 operatively engages with the second fastener 124 of the x-ray holder 110, such that the sextant 106 can be releasably and adjustably fastened to the x-ray film holder 110. For example, when the first fastener 136 of the sextant 106 is a magnetized member and the second fastener 124 of the x-ray holder 110 is a ferromagnetic member 124, the sextant 106 will be magnetically and releasably attached to the x-ray film holder 110 upon contact. In addition, the sextant 106 can be easily adjusted along a surface 18' of the base portion 116 where the ferromagnetic member 124 is positioned proximate to, such that the sextant 106 can e.g., be fastened to the base portion 116 yet slidingly adjustable along the surface 18' of the base portion 116.

It will be appreciated by those skilled in the art that changes could be made to the embodiments described above without departing from the broad inventive concept thereof. For example, the sextant 106 may be releasably held to the x-ray film holder 10 by a clamp, an adhesive, a detent, or the like. It is understood, therefore, that this invention is not limited to the particular embodiments disclosed, but it is intended to cover modifications within the spirit and scope of the present invention.

We claim:

1. A radiolucent x-ray film holder comprising:
   a base member that includes:
      a substantially planar surface to receive a dental simulation model, and
      a releasable contact fastener positioned proximate the planar surface to releasably fasten the dental simulation model to the base member; and
   a support member connected to the base member, the support member including a support fastener to releasably support an x-ray film.

2. The radiolucent x-ray film holder of claim 1, wherein the releasable contact fastener and the support fastener are spaced apart a predetermined distance to configure the dental simulation model in a spaced apart relation to the x-ray film by the predetermined distance.

3. The radiolucent x-ray film holder of claim 1, wherein the releasable contact fastener is selected from the group consisting of a magnet, a hook and loop fastener, a detent, and an adhesive.

4. The radiolucent x-ray film holder of claim 3, wherein the magnet is configured to be substantially housed within the base member and a ferromagnetic member is configured to be substantially housed within the dental simulation model.

5. The radiolucent x-ray film holder of claim 1, wherein the support fastener is a press-fit slot.

6. The x-ray film holder of claim 1, wherein the support member further includes a radiopaque marker.

7. A dental x-ray training system comprising:
   a dental simulation model that includes at least one sextant having a first fastener; and
   an x-ray film holder that includes:
      a first member having a second fastener, wherein the second fastener operatively engages the first fastener to releasably and adjustably fasten the sextant to the first member, and
      a second member connected to the first member and configured to receive and releasably support an x-ray film, and wherein the second member includes a radiopaque marker.

8. The dental x-ray training system of claim 7, wherein the first fastener is a magnet and the second fastener is a ferromagnetic member.

9. The dental x-ray training system of claim 7, wherein the second member is configured as a press-fit slot for receiving an x-ray film.

10. The dental x-ray training system of claim 7, wherein the second fastener and the second member are spaced apart a predetermined distance to configure the sextant in a spaced apart relation to the x-ray film by the predetermined distance.

11. A holder for supporting a dental simulation model and a film comprising:
    a base that includes:
       a substantially planar surface to receive the dental simulation model,
       a releasable contact fastener positioned proximate the planar surface to releasably fasten the base to the dental simulation model, and
       a first support member connected to the planar surface; and
    an extension slidably connectable with the base, the extension including a second support member that operatively engages with the first support member to releasably support the film.

12. The holder of claim 11, wherein the first and second support members form an adjustable support to releasably engage the film.

13. The holder of claim 11, wherein the first and second support members are configured to clamp onto the film by sliding engagement of the extension with the base.

14. The holder of claim 11, wherein the first support member includes a radiopaque marker.

15. The holder of claim 11, wherein the releasable contact fastener is selected from the group consisting of a magnet, a hook and loop fastener, a detent, and an adhesive.

16. The holder of claim 15, wherein the magnet is configured to be substantially housed within the dental simulation model and a ferromagnetic member is configured to be substantially housed within the base.

17. The holder of claim 11, wherein the base and extension are fixed from sliding engagement by a fastener.

18. The holder of claim 17, wherein the fastener is selected from the group consisting of a set screw, a clamp, and a locking pin.

19. A dental x-ray training system comprising:
    a dental simulation model that includes at least one sextant having a first fastener; and
    a holder that includes:
       a first member having:
          a second fastener that operatively engages the first fastener to releasably and adjustably fasten the sextant to the holder, and
          a first support extending from the first member, and a second member slidably connectable with the first member, the second member including a second support that operatively engages with the first support to releasably support a film.

20. The dental x-ray training system of claim 19, wherein the first and second supports are configured to releasably engage and support the film.

21. The dental x-ray training system of claim 19, wherein the first fastener is a magnet and the second fastener is a ferromagnetic member.

22. The dental x-ray training system of claim 19, wherein the first member further includes a radiopaque marker.

23. The dental x-ray training system of claim 19, wherein the second member further includes a radiopaque marker.

24. A radiolucent device comprising:
- a base configured to releasably receive and fasten to a dental simulation model; and
- an adjustable clamp connected to the base to secure the base to an x-ray film, the adjustable clamp including a radiopaque marker configured between the dental simulation model and the x-ray film.

* * * * *